L. E. GRANT & E. A. WEGENER.
EYEGLASS MOUNT.
APPLICATION FILED JAN. 25, 1910.
964,239.
Patented July 12, 1910.
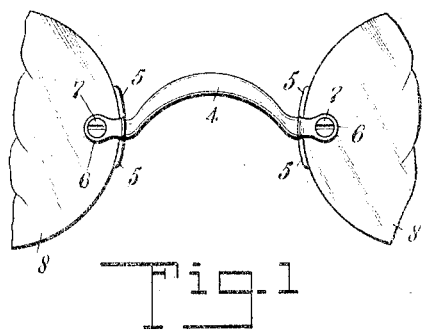
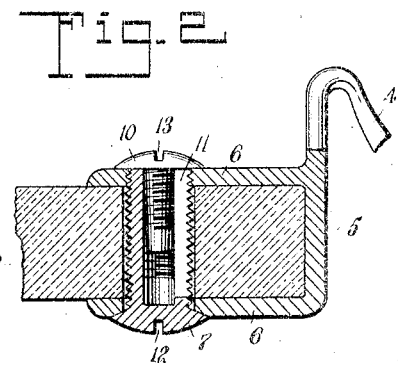
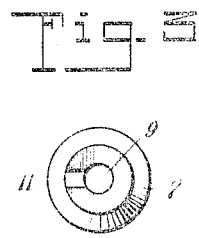
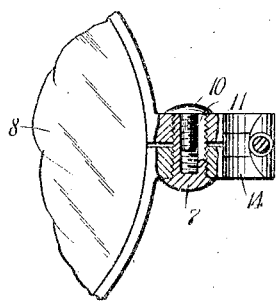
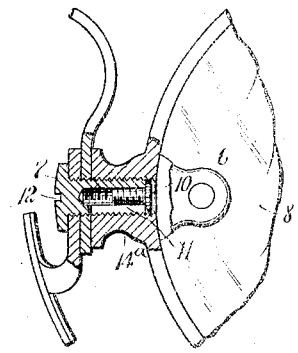
WITNESSES
INVENTORS
Lorenzo Karl Grant
Ernst A. Wegener
BY
ATTORNEYS

UNITED STATES PATENT OFFICE.

LORENZO EARL GRANT AND ERNST A. WEGENER, OF PORTAGE, WISCONSIN.

EYEGLASS-MOUNT.

964,239.

Specification of Letters Patent. Patented July 12, 1910.

Application filed January 25, 1910. Serial No. 540,067.

*To all whom it may concern:*

Be it known that we, LORENZO EARL GRANT and ERNST A. WEGENER, both citizens of the United States, and residents of Portage, in the county of Columbia and State of Wisconsin, have invented a new and Improved Eyeglass-Mount, of which the following is a full, clear, and exact description.

Among the principal objects which the present invention has in view are: to provide fastening devices for securing the lens in the mount, embodying means for locking the fastening devices; and to provide a construction which is simple, durable and efficient.

One embodiment of the present invention is disclosed in the structure illustrated in the accompanying drawings, in which like characters of reference indicate corresponding parts in all the views, and in which—

Figure 1 is a front elevation of a nose bridge for eye-glasses, having secured thereto fragments of lenses therein held by mounts constructed and arranged in accordance with the present invention; Fig. 2 is an enlarged detail view in horizontal section, of a fragment of the mount illustrated in Fig. 1; Fig. 3 is an enlarged detail end view of the expansible hollow screw shown in Fig. 2; Fig. 4 is an enlarged detail of the mounting for spectacles, showing in section the construction of the bow pivot, and Fig. 5 is an enlarged view in detail, showing in section the construction of a nose glass and the spring mounting stud therefor when formed in conformity with this invention.

Serious inconvenience is experienced by wearers of eye-glasses and, spectacles as at present constructed, in the fact that the small screws used for securing the lenses in position in the mounts become loosened, and when frequently tightened the screw threads in the anchor straps become worn and stripped. The anchor straps are necessarily thin and their screw threading capacity is therefore limited. A further inconvenience which has been experienced by wearers of spectacles and nose glasses, where the lenses have been held in claw mounts, has existed in the fact that if a pressure be exerted upon the fastening screw extended between the clamp straps of the mount, the lenses are liable to be broken. Unless considerable pressure is applied upon the fastening screws, the same will not hold in the threaded perforations provided for them except when the shank ends are slightly protruded and headed. This last is an operation which can only be safely performed by a mechanic operating in the line to which the art pertains, and then often breaking the lens owing to the riveting being too close.

By the present invention the above mentioned objections are wholly obviated, as our expansible screw entirely removes all strains from the lens.

The nose bridge 4 shown in the drawings is of the usual type, having braces 5, 5 for adjusting the horizontal axis of the lens, and side clamps 6, 6. In the present instance the clamps 6, 6 are provided with perforations sufficiently large in the one clamp to pass a screw 7, while in the other clamp the perforation is tapped to provide screw threads to engage the threads formed on the shank of the said screw 7. Between the clamps 6, 6 is inserted a lens 8 prior to placing the screw 7 in position and screwing the same into the tapped perforation of the clamp 6. The screws 7 are provided with a centrally bored hole 9. This hole 9 is suitably tapped to provide a screw thread suited to engage the screw threads on the shank of a screw 10. The shank of the screw 10 is tapered, as illustrated in Fig. 2 of the drawings. The upper end of the shank adjacent to the head of the screw 10 is gradually enlarged so that when the screw 10 is set up in the hole 9, a considerable outward pressure is exerted on the walls of the screw 7. It is to permit the walls of the screw 7 to spread that we have formed one or more slots 11 in the shank of the screw 7, leading into the hole 9 and extending lengthwise of the shank. When now the screw 10 is driven into the hole 9, the enlarged upper section thereof spreads the walls of the shank of the screw 7, increasing the diameter thereof by jamming the same hard against the side of the clamp 6. The screw 7 is slotted, as at 12, to receive the usual screw driver, while the screw 10 is slotted, as at 13, for the same purpose. The screw 7 is driven in place until snug against one clamp 6. The screw 10 is set up tight against the other clamp 6. In the first part of the operation the screw 7 is tightened until the clamps 6, 6 are drawn firmly but gently upon the interposed lens 8. The screw 10 is then inserted within the hole 9 and driven home. In the last two turns of the screw 10 the increased diameter of the shank thereof spreads outward, as above described, the walls of the shank of the screw 7, jamming the same against the threaded wall of the clamp 6. This effort is exerted along the lines of greatest resistance on the part of the clamp, any movement in avoidance thereof having to overcome the tensile strength of the metal of which the said clamp is composed. Further, in the operation of spreading the shank of the screw 7, the threads thereof are expanded so that they bite upon the threads of the screw 10. These movements of the two screws and clamps result when the screw 10 is finally seated, in locking the members in fixed position.

It is obvious that only when glasses are provided with a mounting of the nature described and illustrated, that in the event of loosening of the screws 7 and 10, these may be tightened without necessitating any great care in the operation to prevent the breaking of the lenses. Therefore, the operation may be performed by the wearer, though unskilled in the use of tools. The many inconveniences mentioned are thereby obviated.

In Figs. 4 and 5 of the drawings is shown the adaptation of our expanding screw and wedge screw pin as applied to spectacle and nose glass mounts. In these forms the screw 7 is expanded directly against the studs 14, 14ª. In the case of the spectacle mount the screws 7 and 10 are both exposed and may be manipulated at any time. In the nose glass mount the screw 10 is driven home to seat the screw 7, and then the lens 8 is mounted between the clamps 6, 6 and therein secured by the screws 7 and 10 in the manner above described and as shown in Fig. 2.

Having thus described our invention, what we claim as new and desire to secure by Letters Patent is:—

1. An eye glass mount, comprising lens clamping members adapted to extend on opposite sides of said lens, one of said members having a screw threaded perforation and the other of said members provided with a smooth and enlarged perforation in line with the said threaded perforation; an extended headed split tubular screw having external threads adapted to pass through the said smooth perforation and to engage the said threaded perforation of said clamping members to draw the said clamps upon the said lens; and a tapered member adapted to be inserted within said split screw to spread the same against the clamping member having said threaded perforation.

2. An eye glass mount, comprising lens clamping members adapted to extend on opposite sides of said lens, one of said members having a screw threaded perforation and the other of said members provided with a smooth and enlarged perforation in line with the said threaded perforation; an extended headed split tubular screw having external and internal threads, and adapted to engage the said threaded perforation of said clamping member to draw the said clamping members upon the said lens; and a tapered screw adapted to engage the said internal threads of said split screw to spread the said split screw against the sides of said threaded perforation.

3. An eye glass mount, comprising a plurality of separable perforated members, the perforation in one member whereof is provided with a screw thread; a split tubular screw adapted to engage the threaded perforation and having a head to overlie the said separable members to draw the said members together by driving said screw in said threaded perforation; and a tapered member adapted to be inserted in the said tubular screw at the split end thereof to force the said screw into holding contact with the said threaded perforation.

4. An eye glass mount, comprising a plurality of separable perforated members, the perforation in one member whereof is provided with a screw thread; a split tubular screw having external and internal guide threads at the split end thereof, and at the opposite end an extended head; and a tapered expanding screw adapted to be inserted within said tubular screw to expand the split portion thereof against the sides of said threaded perforation.

In testimony whereof we have signed our names to this specification in the presence of two subscribing witnesses.

LORENZO EARL GRANT.
ERNST A. WEGENER.

Witnesses:
  A. HOLMES,
  JOHN H. GRANT.